United States Patent [19]
Hedderly

[11] Patent Number: 5,559,805
[45] Date of Patent: Sep. 24, 1996

[54] OUTSTATION RANGING IN DEMAND ASSIGNMENT, TIME DIVISION MULTIPLE ACCESS, COMMUNICATION SYSTEM

[75] Inventor: David L. Hedderly, Watnall, England

[73] Assignee: GPT Limited, United Kingdom

[21] Appl. No.: 294,139

[22] Filed: Aug. 22, 1994

Related U.S. Application Data

[63] Continuation-in-part of Ser. No. 976,978, filed as PCT/GB91/02198, Dec. 11, 1991, abandoned.

[30] Foreign Application Priority Data

Dec. 12, 1990 [GB] United Kingdom .................. 9026932

[51] Int. Cl.6 .................................................. H04B 7/212
[52] U.S. Cl. .......................................... 370/95.3; 370/103
[58] Field of Search .................. 455/51.1, 69; 375/356, 375/350, 371; 370/85.7, 85.8, 95.1, 95.3, 100.1, 102, 103, 104.1, 105.3, 108

[56] References Cited

U.S. PATENT DOCUMENTS

| | | | |
|---|---|---|---|
| 4,642,806 | 2/1987 | Hewitt et al. | 370/95.3 |
| 4,653,049 | 3/1987 | Shinmyo | 370/103 |
| 4,757,460 | 7/1988 | Bione et al. | 370/103 |
| 5,166,929 | 11/1992 | Lo | 370/95.3 |
| 5,341,365 | 8/1994 | Clarke | 370/95.3 |
| 5,384,777 | 1/1995 | Ahmadi et al. | 370/95.3 |

Primary Examiner—Benedict V. Safourek
Attorney, Agent, or Firm—Kirschstein, et al.

[57] ABSTRACT

In a multi-station, demand assigned, time division multiple access system, digital information is communicated from a head end to a population of outstations so that all the outstations receive the stone stream of digital information and select their traffic from it. Traffic is only sent to and from an outstation when there is a demand for it. As the outstations are at random ranges from the head end, it is necessary to know the times of travel for bursts of information so they arrive at the head end sequentially. Free time in each frame is consolidated and made available for ranging-in outstations.

5 Claims, 5 Drawing Sheets

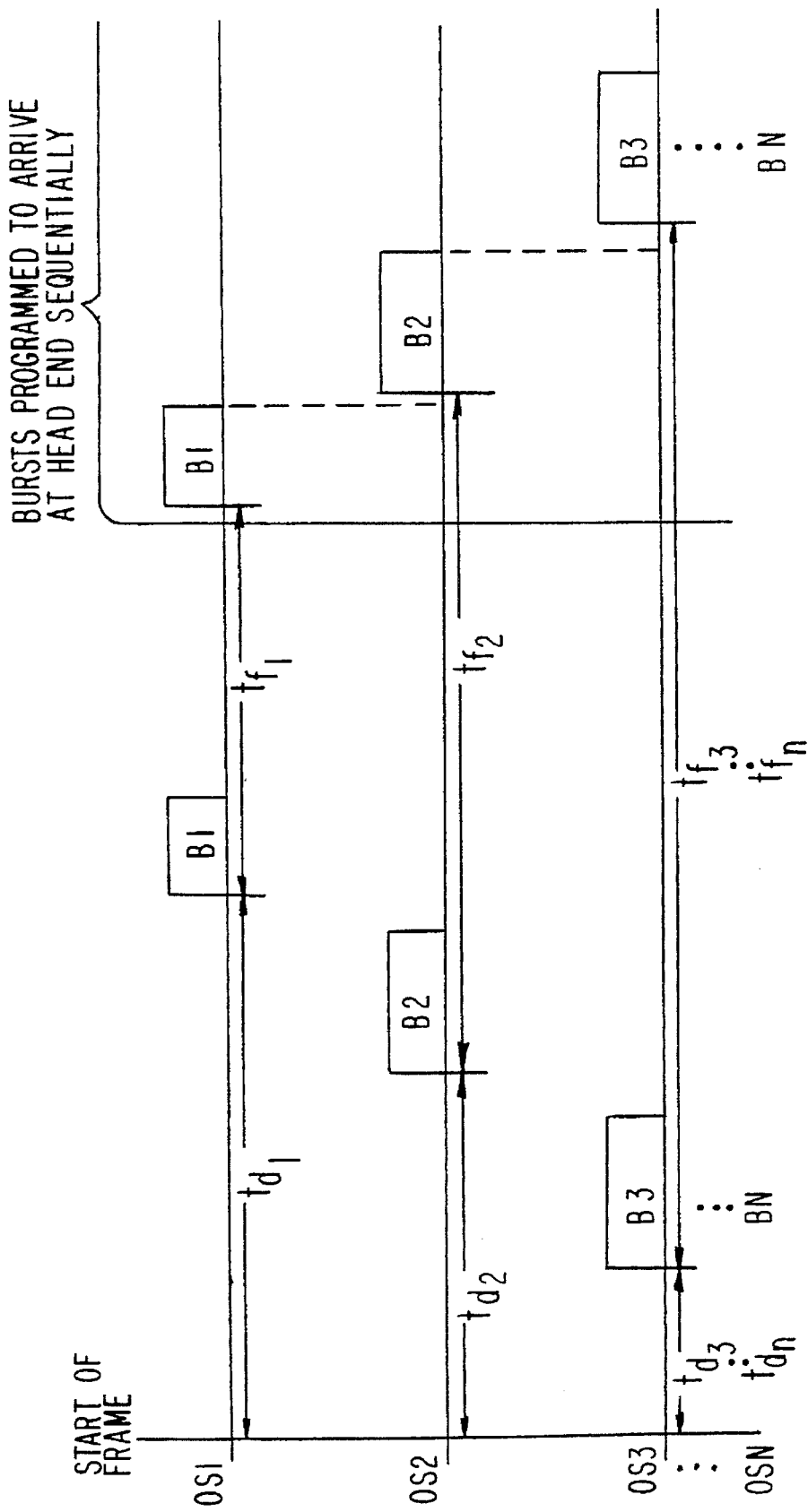

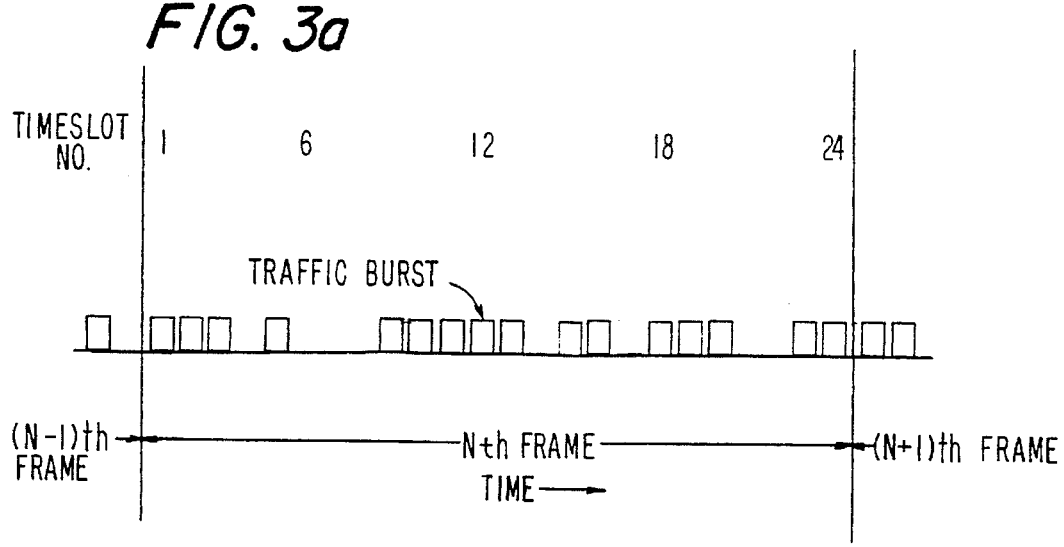
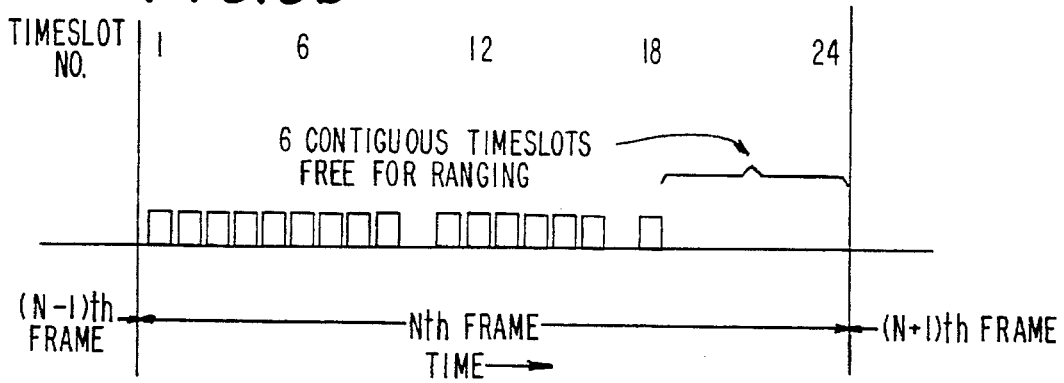
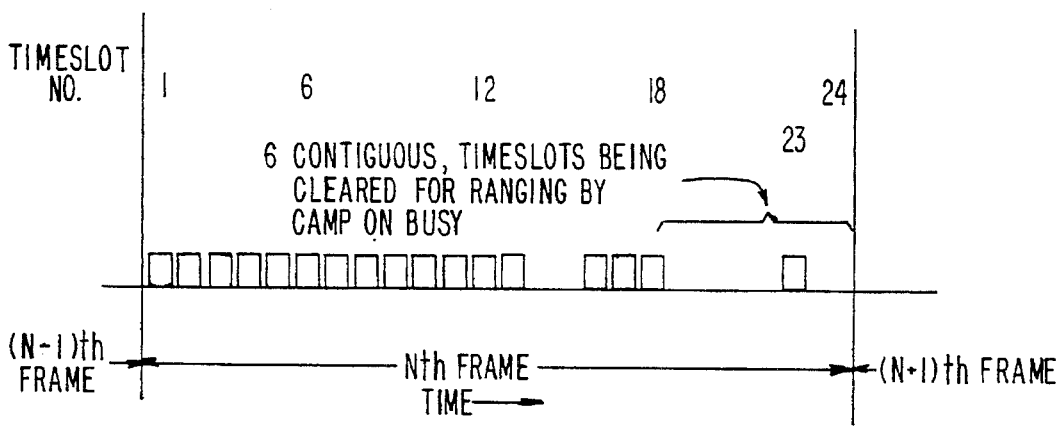

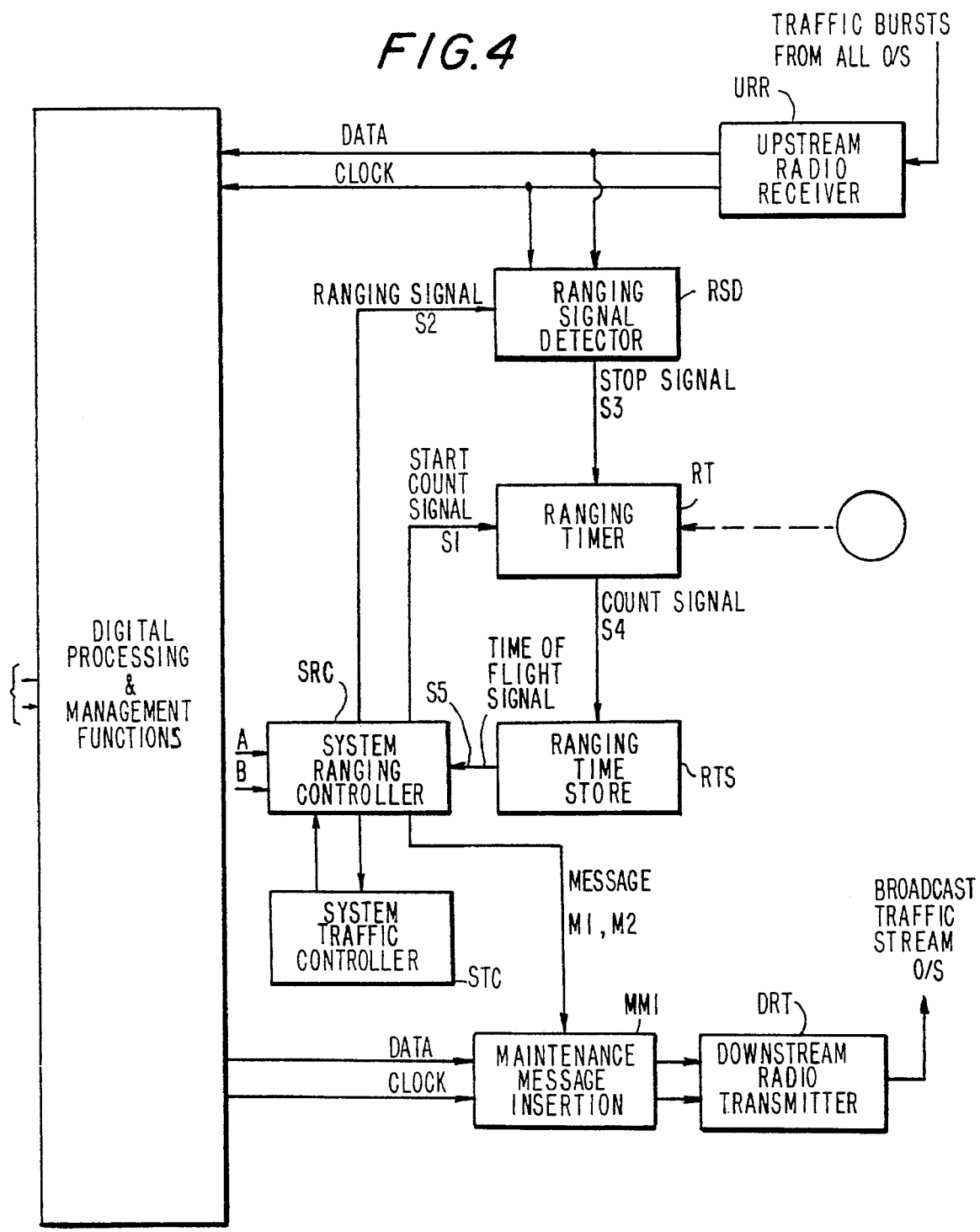

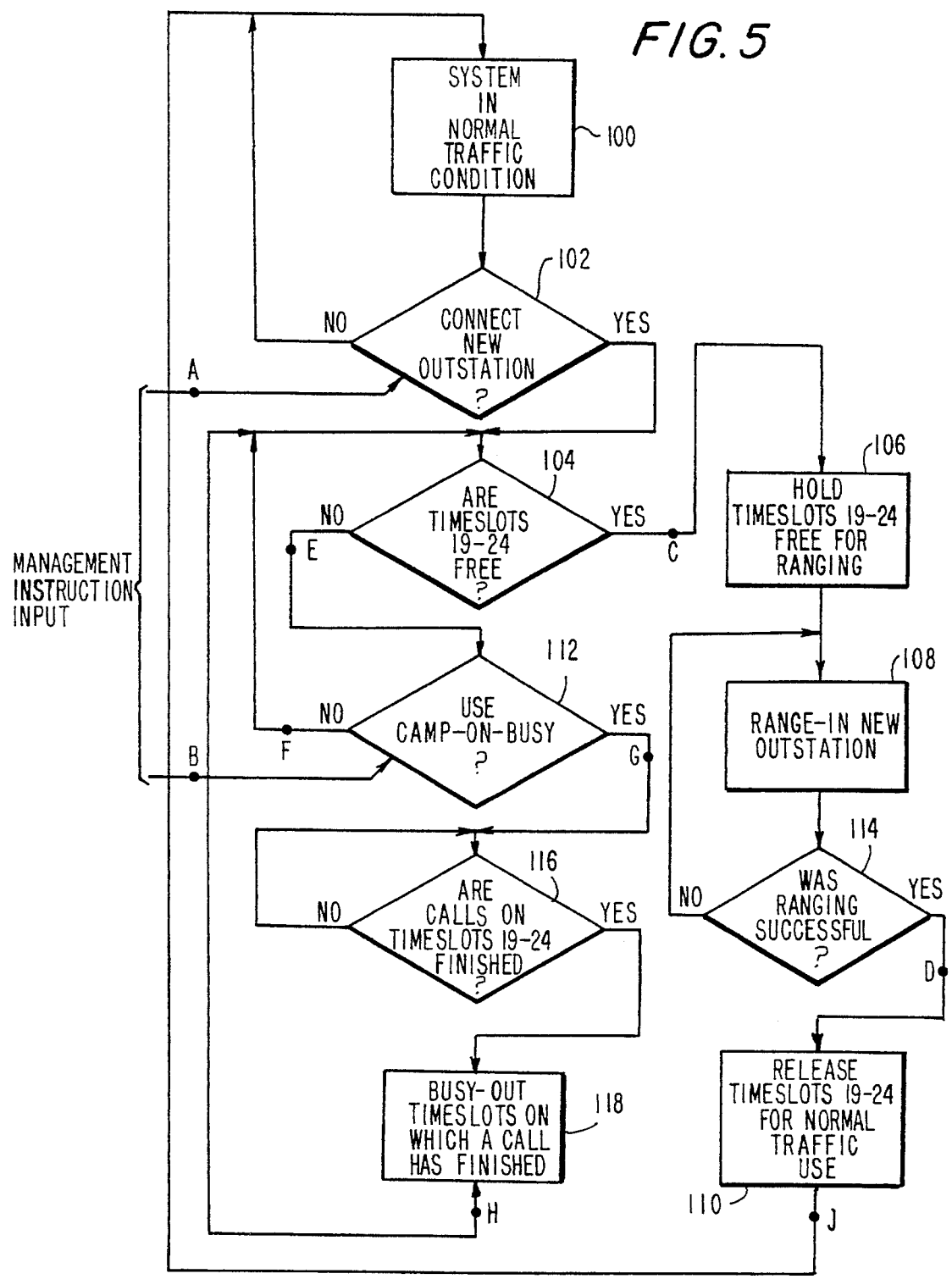

OUTSTATION RANGING IN DEMAND ASSIGNMENT, TIME DIVISION MULTIPLE ACCESS, COMMUNICATION SYSTEM

CROSS-REFERENCE TO RELATED APPLICATIONS

This application is a continuation-in-part of U.S. patent application Ser. No. 07/976,978, filed as PCT/GB91/02198, Dec. 11, 1991, now abandoned.

BACKGROUND OF THE INVENTION

The present invention concerns digital communication systems and is particularly concerned with multi-station, demand-assigned, time division multiple access systems in which a population of outstations communicate with a head end or head station via a common transmission medium. For the remainder of this specification, demand-assigned, time division multiple access systems will be referred to as DA-TDMA systems.

In such systems, digital information is communicated from the head end to the outstations in such a manner that all the outstations receive the same stream of digital information and select their traffic from it under the command of the head end. Traffic is only sent to and from an outstation when and to the extent that, there is a demand for it, e.g., in a DA-TDMA system forming part of a public switched telephone network when a call is to be sent to or from an outstation.

It is a characteristic of such systems that the outstations are at random and unplanned distances from the head end. The transmission of digital information from the head end to the outstations is known as downstream transmission. The fact that the distances between the head end and the outstations are random presents no problem to downstream transmission.

Digital information transmission in the other direction from an outstation to the head end is known as upstream communication, and this does present a problem. This is because it is necessary for upstream communications to be arranged so that they do not overlap in time and thereby interfere with one another. A well known method is to transmit a burst of information from each outstation that is carrying traffic at that time in turn, and so time the transmission of these bursts that they arrive at the head end sequentially and without overlap.

In order to achieve this, there must be knowledge within the system of the times of flight of bursts of digital information from each outstation to the head end. The process of gaining this information and putting it to use so as to avoid overlap is known as "ranging". The repetition rate and accuracy required of the ranging process depends on the nature of the system, that is, whether it is static, mobile, radio, cable T.V., optical, etc.

One application of such TDMA systems is to multi-point radio, optical and co-axial cable systems with fixed or quasi-fixed outstations. In such a network, the rate of change of range is very low, and a common technique is to "range-in" an outstation when it first wishes to communicate and subsequently to observe the relative time of reception of information bursts at the head end and, if necessary, marginally correct it by sending messages to the outstation during the subsequent period of communication by the outstation.

The present invention is concerned with carrying out the initial ranging-in of an outstation on "installation".

Two methods are already known for dealing with this problem. In the first method, a "dead time" or "guard time" is kept clear in the uplink or upstream transmission, specifically for the purpose of ranging. An outstation transmits a pulse or short pulse train, when commanded to do so by the head end, within this guard time. The time of arrival of this pulse or short pulse train at the head end is then measured by the head end, and information is sent to the outstation to transmit its uplink traffic bursts data at a specific time so as to avoid overlap with the traffic from other outstations.

In the second method, ranging information is transmitted from outstations on the uplink at a low level at the same time as the wanted uplink data, using a long digital sequence with a high autocorrelation function. This ranging information signal is kept low enough in level so as not to interfere with the normal uplink data reception. At the head end, a separate part of a receiver is employed, which determines the range using a correlator to identify the most likely time of arrival of this low level digital sequence.

Both these known systems have disadvantages, particularly in the case of multi-point optical, radio and co-axial cable TDMA systems. The first method results in a quantity of unavailable transmission time and can also involve digital storage and delay of the uplink traffic. The second method is complex and involves considerable digital processing. It also normally requires multiple transmissions of the ranging signal.

The present invention is divided from United Kingdom patent application Ser. No. 9026932.5. A further United Kingdom patent application Ser. No. 9126350.9, now United Kingdom Patent No. 2252882A, has been filed, claiming priority from that first-mentioned application.

SUMMARY OF THE INVENTION

According to the present invention, there is provided a ranging system for a multi-station, demand assigned., time division multiple access (DA-TDMA) system which a population of outstations communicate with a head end via a common transmission medium in frames having multiple timeslots. The ranging system ranges-in a new outstation by consolidating a group of adjacent, free timeslots in a consolidated time period of each frame, and by conducting the ranging-in of the new outstation during that consolidated time period.

BRIEF DESCRIPTION OF THE DRAWINGS

The present invention will now be described by way of example and with reference to the accompanying drawings in which:

FIG. 2 is a timing diagram of the sequential arrival of bursts from the outstations at the head end;

FIG. 3a depicts a prior art frame N having multiple timeslots, some of which are occupied by bursts received at the head end;

FIG. 3b depicts the frame N for the same level of traffic as in FIG. 3a, but with multiple, adjacent, free timeslots consolidated in accordance with this invention;

FIG. 3c depicts the frame N whose timeslots are being cleared during a "camp-on-busy" situation;

FIG. 4 is a block diagram of a ranging system at the head end of a DA-TDMA radio system; and FIG. 5 is a flow chart depicting the operation of the system of FIG. 4.

DETAILED DESCRIPTION OF THE PREFERRED EMBODIMENTS

Figure 1:
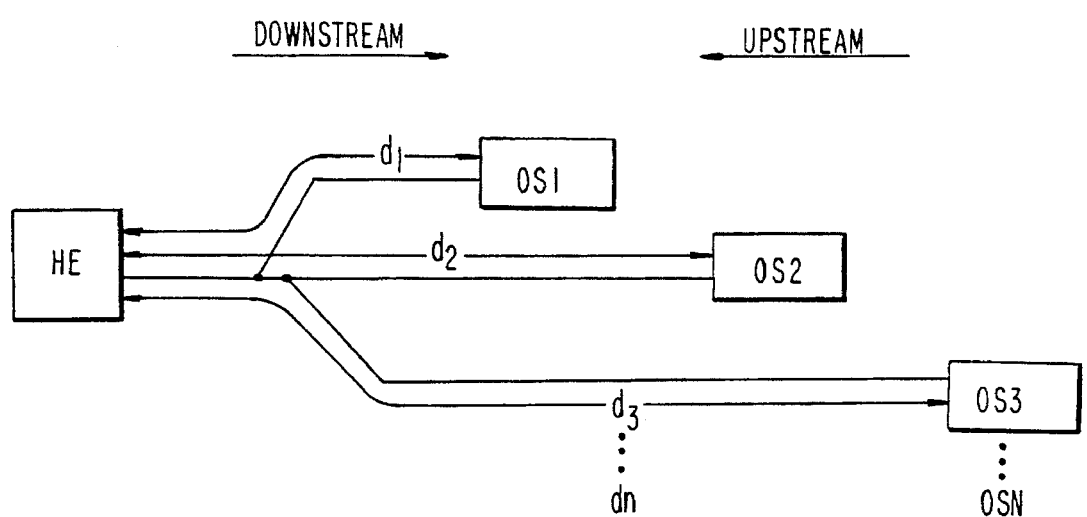
FIG. 1 is a block diagram showing a head end and some associated outstations in a DA-TDMA system.

Referring now to FIG. 1 of the drawings, tiffs shows a head station or head end HE connected over a transmission medium to a plurality of outstations OS1, OS2, OS3, . . . OSN, at distances $d_1$, $d_2$, $d_3$, $d_n$ respectively. The system can be increased by the addition of other outstations, as is indicated. Upstream (uplink) and downstream (downlink) directions are indicated.

FIG. 2 is a timing diagram showing how bursts B1, B2, B3, . . . BN, of main traffic signals from the respective outstations to the head end may be programmed to arrive sequentially at the head end once the programmed delay times $t_{d1}$, $t_{d2}$, $t_{d3}$ . . . $t_{dn}$, are known. The times of flight $t_{f1}$ . . . $t_{fn}$ of the bursts B1 . . . BN from the outstations OS1 . . . OSN due to the distances $d_1$ . . . $d_n$ are also shown.

In a demand assignment, time division multiple access, communication system, the plurality of outstations OS1, OS2 . . . OSN is operative for transmitting digital bursts B1, B2 . . . BN of information in frames having multiple timeslots over a common transmission medium, e.g., air space, (see "upstream" lines in FIG. 1), to the head end. Such a communication system utilizes a ranging system (see FIG. 4) for ensuring the sequential arrival of the bursts at the head end.

This invention is directed to how and when to install or "range-in" a new outstation that is demanding a timeslot assignment. The communication system does not want the information bursts from the new outstation to overlap those of other outstations.

In general terms, this invention proposes consolidating a group of adjacent, free timeslots in a consolidated time period, i.e., an undivided part, of each frame, and conducting the ranging-in of a new outstation during that consolidated time period.

In order that the principles of this invention may be more clearly understood, a typical design of a DA-TDMA system embodying the invention will now be described. It is to be understood that the bit rates, numbers of timeslots, etc., are far from unique and that other quite different DA-TDMA systems could equally well be designed to take advantage of this invention. The following description is of a terrestrial radio DA-TDMA system; however, it must be stressed that the principles of the invention may equally be applied to any DA-TDMA system operating over any continuously available transmission medium. Such media include, but are not limited to, point-to-multi-point optical fibre networks and CATV systems equipped with an upstream channel. All that is required is that one of the stations, designated as the head end, broadcasts continuously and is received by all the other stations, designated as the outstations, on one communication channel, and that all the outstations communicate with the head end over a second, shared, communication channel by bursts of information from each outstation which are only sent to the head end when there is traffic to be carded. Further, these bursts are sent from the outstations under the unique direction of the head end in such a way that they arrive at the head end without mutual interference.

The radio system described here collects 64Kbit/s digital PSTN traffic from a population of more than twenty-four geographically separate outstations contained anywhere within a radius of 33 km and concentrates this onto twenty-four 64Kbit/s channels in a T1 digital stream so that this T1 stream can be interfaced to a main PSTN network at, or upstream of, the head end. On the basis that the bulk of traffic is, for example, from outstations who are residential customers, one such DA-TDMA system might serve around 240 outstations; however, the number actually served is at the discretion of the DA-TDMA system operator and depends on the telecommunications traffic offered by the outstations and the grade of service the system operator chooses to provide. For this description, it is assumed here that all traffic consists of 64Kbit/s calls lasting a few minutes. In an actual system, a greater variety of traffic types might well be encountered, but this does not affect the principle of the operation of this invention.

The downlink digital traffic from the head end to all the outstations is sent as a continuous digital stream with twenty-four traffic timeslots in each frame. It is necessary in such systems to keep the overall delay to a minimum and, consequently, the frame is kept as short as possible consistent with an efficient use of the transmission medium. For this embodiment, the frame is 1 millisecond long. This is in line with general Bellcore [and British Telcom in the UK] requirements for access networks. Each one millisecond frame can, therefore, carry, at most, 1536 bits of traffic information which are organized into, at most, twenty-four traffic timeslots each containing 64 traffic bits. Added to this is maintenance and system overhead capacity on the downlink comprising 480Kbit/s, for reasons described below. The uplink and downlink digital rates are equal to simplify digital processing at the outstations, with the consequence that the overhead capacity needed within the system is determined by the more onerous needs of the uplink since these needs include synchronization requirements at the head end for each of the twenty-four upstream traffic bursts. An additional twenty bits are added to each upstream burst for head end synchronization and inter-burst guard time requirements. This leads to an internal system transmission rate of 24*[20+64] per millisecond or 2.016Mbit/s. On the downlink, all the timeslots for which there is no traffic are filled with a random pattern of digits to help maintain clock recovery at the outstations.

On the uplink, traffic from an active outstation arrives at the head end in up to twenty-four bursts contained with twenty-four timeslots. The outstations must time their transmissions so that these bursts arrive contained within the specific timeslot allocated to them by the head end prior to the start of a call. When a call is finished, the uplink and downlink timeslot:; that it occupied are relinquished, and the head end then reallocates this timeslot for a subsequent call; or, as is the subject of this patent, it puts it to use for some other purpose.

In order for an outstation to correctly time its transmissions, it must accurately know the time of flight of their burst to the head end. Before they are first brought into commission, they will not possess this information and its acquisition is the essential first part of the operation of ranging. In the radio system described here, the uncertainty in range of 33 km means that there is an uncertainty as to the time of flight of bursts to the head end of 110 μs; this is 33 km divided by the velocity of radio waves in air, which is approximately 0.3 km/μs. The total uncertainty as to the time of reception of a burst from the outstation, following a request from the head end to the outstation to send a short burst, just for ranging purposes, is twice this time of flight from the outstation, namely 220 μs. Accordingly, this amount of time has to be made available on the uplink by the head end when ranging-in a new outstation has to be carried out. This, of course, depends on existing uplink traffic not being interfered with. This means that: in order to use the principle of this invention; six consecutive timeslots of 41.7 μs, adding to 250 μs, must be made free.

While any six consecutive timeslots would suffice, an advantageous arrangement is to always allocate new traffic to the lowest number available timeslot in the frame and to always use the six highest number timeslots for ranging. The operation of ranging, then, has the least impact on the traffic being carried and can be effected more rapidly than with some other traffic allocation schemes. It must be stressed, however, that, while the strategy described above for allocating timeslots for traffic and ranging is sufficient, and is a beneficial strategy, it is not the only strategy for choosing a group of six contiguous timeslots.

FIG. 3a shows a typical pattern of bursts as received at the head end in a DA-TDMA system with a total of twenty-four timeslots in the Nth frame. Such frames are endlessly repeated. The actual maximum number of timeslots available for traffic depends on system design and the number twenty-four has been chosen for the purpose of this example only. The pattern of timeslots shown in FIG. 3a is essentially random. A pattern such as this would have resulted from the random assignment by the head end of timeslots to traffic as it presented itself, and as some of the traffic subsequently ceased. If there is no constraint on the use of timeslots, then they may be assigned to traffic as it arises in a random manner, until the frame is full. In this example shown, there are, in that particular frame, eight free timeslots, but with the longest contiguous free period being, by chance, only three timeslots long. If the timing within the system, and the distances to outstations, were such that, for example, six contiguous timeslots were required for ranging, then this operation could not take place with the traffic as shown.

FIG. 3b shows a pattern of bursts as received at the head end for the same level of traffic as in FIG. 3a, but where six empty timeslots have been consolidated into a period of contiguous free time suitable for ranging. In the example shown, these are timeslots 19 to 24 inclusive. In order to get these six timeslots free for ranging as shown in FIG. 3b, it is necessary either to wait until they are all free by chance or, more constructively, to alter the traffic assignment rules so as to progressively leave empty the six timeslots as calls within them are terminated and to allocate new calls to timeslots elsewhere in the frame, rather than totally at random. However, if the traffic is of such a volume that, during this "Allocate new timeslots not in the ranging block of timeslots" operation, less than six timeslots are available, then the only course of action is to wait until the traffic falls sufficiently. This method of allocation evidently gives precedence to carrying all the traffic the system is offered over the function of ranging-in a new outstation, but it will clear the six timeslots more speedily than a random traffic allocation arrangement will.

FIG. 3c shows a "Camp-On-Busy" situation. This invokes a different traffic assignment rule than that shown in FIG. 3b. In this case, the six timeslots shown are operated under the rule that existing traffic is not thrown off, but that once a call finishes, its timeslot is thereafter kept clear for ranging. In the example shown in FIG. 3c, all timeslots except timeslot 23 have been cleared of traffic. When that call finishes, the six timeslots will have been cleared for ranging. In periods of heavy traffic, this assignment rule will reduce the delay before all six timeslots are available for ranging compared with that shown in FIG. 3b, but it restricts the traffic-carrying capacity of the system from twenty-four to eighteen timeslots until ranging is complete. The Camp-On-Busy arrangement, therefore, results in the system giving precedence to ranging-in a new outstation over accepting new traffic, although it does not interrupt calls already in progress.

It would be possible to instantly force off existing traffic within the six timeslots in order to clear them but., in the area of public telecommunications, where DA-TDMA systems of the .type being considered here traditionally operate, this would not normally be the strategy of choice since service to customers is a first consideration, except possibly in an emergency where bringing an outstation into service is judged to be of overriding importance.

FIG. 4 shows a ranging system and FIG. 5 shows a flow chart of the operations within the DA-TDMA system that are necessary to range-in a new outstation. The flow chart has been intentionally simplified so that it does not include watch-dog timers, delays, or other related functions, in some of the loops shown. It will be evident that such additional features are necessarily also included in a practical realization.

Starting with the system in normal traffic condition (block 100), the system moves out of this state following receipt of a specific management instruction [A] received at block 102 to start the ranging procedure. Timeslots 19 thru 24 are then automatically checked at block 104 by the system traffic controller [STC], as shown in FIG. 4, to see if they are all free of normal traffic. If, by chance, they are free [C], they are then held free of traffic at block 106 and a new outstation is ranged in at block 108, following a successful ranging; at block 114, after which they are released at block 110 [J]. This might well be the case late at night, for instance, when traffic is low.

During the working clay, however, and particularly in the busy hour, it is unlikely that all of the timeslots 19 thru 24 will be free just when it is necessary to range-in a new outstation. If these timeslots are not free [E], then a management decision [B]is taken as to whether or not to wait until they are all free by chance [F], or to busy them out at blocks 112, 116, and 118, progressively until they are all free [G]. In the former case, they are then monitored and only when all timeslots 19 thru 24 are free [C] are they then all busied out, and ranging carried out. If, on the other hand, it is decided to use the "Camp-On-Busy" function [G] at block 112, then each timeslot between numbers 19 and 24 inclusive is held free for ranging [H] as soon as it becomes free of traffic until all timeslots 19 thru 24 are free [C], when ranging is carried out [D] . All timeslots 19 thru 24 are then released at block 110 for use by normal traffic [J].

FIG. 4 shows the components of the head end of this DA-TDMA radio system insofar as they relate to the realization of this invention. The parts not shown in detail are common to any DA-TDMA radio system and consist of the digital processing and the interfaces to the communication network standing above the radio system, typically the PSTN. It is to be understood that the following description of how ranging is carded out, once six contiguous timeslots have been made available for this purpose, will be known to those skilled in the art. The essence of this invention relates specifically to how the time in the frame is made available to do the ranging.

When ranging is to be carried out, management instruction input signals A and B, as described with relation to FIG. 4 above, are sent to the system ranging controller [SRC]. This interacts with the system traffic controller [STC] until all six consecutive timeslots 19 thru 24 are held free of traffic as described above and are, therefore, available for the ranging operation. When this has occurred, a message M1 is sent to the outstation to be ranged-in via the maintenance message insertion [MMI] component and the downstream radio transmitter [DRT].

At the start of the first free timeslot, i.e., No. 19, a signal S1 at the head end is sent from SRC to a ranging timer [RT] to start it counting. At the outstation, consequent on the receipt of message M1, a short ranging pulse is transmitted back to the head end. It is transmitted at the point in time that the outstation detects the start of the first free timeslot, i.e., No. 19. Back at the head end, this short ranging pulse is received by upstream radio receiver [URR] and detected by a ranging signal detector [RSD], which has already been enabled to carry out this detection function by an enabling signal S2 from the SRC. Having detected a ranging signal, the RSD sends a stop signal S3 to the RT. It will be seen that the count accumulated by RT, denoted by the signal S4, is a measure of twice the time of flight from the head end to the outstation in units determined by the speed at which RT is clocked. It is usual to measure the time of flight to an accuracy in excess of one bit period. The actual accuracy of measurement depends on the strategy used for timing recovery at the head end by the URR and is not central to this invention.

Count signal S4 is fed to a ranging time store [RTS] which holds all the S4 signals for the whole population of outstations. These S4 signals are measures of the times of flight from each outstation to the head end. The ranging sequence is repeated several times to ensure that an adequately consistent value for S4 is obtained before the next step of the ranging procedure is instigated.

Once a consistent value of S4 has been achieved for the particular outstation being ranged in, the SRC reads this out as signal S5, and transmits it to the outstation via MMI and DRT. At the outstation, this time of flight signal, S5, is stored. At the head end the SRC instructs; the STC to release timeslots 19 thru 24 for normal traffic. The outstation now has the information it needs to transmit bursts to the head end without their clashing with bursts from any other active outstation.

When the head end is aware that there is a call for a particular outstation, it sends a message to it via MMI and DRT to use a particular timeslot for this call; for example, timeslot 17. The outstation then uses S5 to calculate at what time before the receipt of timeslot 17 it has to transmit its upstream burst so that it is received at the head end within timeslot 17. The guard times referred to above are allocated to account for all the timing errors in this process.

Once an outstation is sending normal traffic bursts to the head end, a separate, in-traffic, control function is activated to re-measure the exact position in time of each traffic burst on a continuing basis. This is sometimes called a "vernier" timer. The values of S4 for each outstation are regularly updated by this means whenever an outstation is active and, if necessary, messages are sent to the outstation to update its value of S5. This in-traffic vernier timing control function uses some of the same components of the system described above to achieve its end.

In summary, the timeslots are demand assigned and, thus, are only present when required for traffic purposes. In this case, there will be a traffic-dependent amount of unoccupied time in the uplink (and downlink) time frame. By organizing the uplink time frame so as always to consolidate an adequate amount of this "free" time, all in one undivided, i.e., contiguous part, this free time can be used for the purposes of ranging-in outstations. To be able to do this, however, the free time must be sufficiently long to cover the uncertainty in range to reach the furthest outstation. A maximum range to the furthest outstation is a necessary characteristic of the system. There are two ways of ensuring that this free time is long enough. The first, and most simple, is to wait until the volume of traffic falls, and then for the head end to issue a repeated call to the outstation to range-in, which operation would only take tens of milliseconds, at most, when effected. Such a sequence would normally be matched by network management control of the head end, knowing a specific outstation was coming into service and would then be effected automatically once the outstation was installed and set to work.

The second way during periods of high traffic is to use a "camp-on busy" function, i.e., for the head end to progressively reserve time on the system as calls are terminated until enough free time is available. Once the outstation is ranged-in, the system is released for normal traffic to use again. Both these ways require that the head end initiates the ranging procedure.

I claim:

1. In a demand assignment, time division multiple access, communication system having a plurality of outstations operative for transmitting digital bursts of information in frames having multiple timeslots to a head station, said outstations being located in a range of distances relative to the head station, a ranging system for ensuring the sequential arrival of the bursts at the head station, said ranging system comprising:

means at the head station for temporarily reserving a group of adjacent, successive, free timeslots in a consolidated time period in each frame when ranging-in is required;

means at the head station for ranging-in a new outstation demanding a timeslot assignment during said consolidated time period; and said consolidated time period having a time duration sufficient to enable the ranging-in means to range-in an outstation located at a maximum end of said range.

2. The ranging system as claimed in claim 1, wherein the means for temporarily reserving includes means for assigning timeslots to each outstation demanding a timeslot assignment in a period of each frame other than said consolidated time period during a low traffic condition, thereby leaving said consolidated time period free of bursts from outstations.

3. The ranging system as claimed in claim 1, wherein the means for temporarily reserving is arranged to reserve the timeslots in the consolidated time period of each frame as soon as transmission of bursts from outstations in said reserved timeslots is terminated during a high traffic condition.

4. The ranging system as claimed in claim 1, wherein the means for temporarily reserving includes means for assigning timeslots to each outstation demanding a timeslot assignment in a period of each frame other than said consolidated time period, thereby leaving said consolidated time period free of bursts from outstations.

5. The ranging system as claimed in claim 1, wherein the means for temporarily reserving includes means for reserving the timeslots in the consolidated time period of each frame as soon as transmission of bursts from outstations in said reserved timeslots is terminated.

* * * * *